(12) United States Patent
Pedersen et al.

(10) Patent No.: US 9,055,540 B2
(45) Date of Patent: Jun. 9, 2015

(54) METHOD FOR CALCULATING A TRANSMIT POWER FOR A USER EQUIPMENT

(75) Inventors: Klaus Ingemann Pedersen, Aalborg (DK); Troels Emil Kolding, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 88 days.

(21) Appl. No.: 14/008,833

(22) PCT Filed: Mar. 31, 2011

(86) PCT No.: PCT/EP2011/054999
§ 371 (c)(1),
(2), (4) Date: Sep. 30, 2013

(87) PCT Pub. No.: WO2012/130310
PCT Pub. Date: Oct. 4, 2012

(65) Prior Publication Data
US 2014/0024380 A1    Jan. 23, 2014

(51) Int. Cl.
*H04W 36/00*  (2009.01)
*H04W 52/24*  (2009.01)
*H04W 52/40*  (2009.01)

(52) U.S. Cl.
CPC .......... *H04W 52/244* (2013.01); *H04W 52/243* (2013.01); *H04W 52/247* (2013.01); *H04W 52/40* (2013.01)

(58) Field of Classification Search
USPC .................................. 455/436–438, 453, 63.1
See application file for complete search history.

(56) References Cited

U.S. PATENT DOCUMENTS

| | | | |
|---|---|---|---|
| 2009/0047962 A1* | 2/2009 | Rao .............................. | 455/437 |
| 2009/0270109 A1* | 10/2009 | Wang Helmersson et al. ............................. | 455/453 |
| 2011/0039561 A1* | 2/2011 | Narasimha et al. ........... | 455/436 |
| 2011/0195730 A1* | 8/2011 | Chami et al. .................. | 455/501 |

FOREIGN PATENT DOCUMENTS

| | | |
|---|---|---|
| WO | WO 02/099978 A2 | 12/2002 |
| WO | WO 2009/058074 A2 | 5/2009 |

* cited by examiner

*Primary Examiner* — Nathan Taylor
(74) *Attorney, Agent, or Firm* — Harrington & Smith

(57) ABSTRACT

There is provided a method of calculating a maximum allowed transmit power for a user equipment within a cellular network system. The cellular network system includes a first cell having a first base station and a second cell having a second base station. The user equipment is served by the first base station. The method includes determining, by the first base station, a maximum degree of interferences being tolerable by the first base station, wherein the interferences are caused by the user equipment following a handover of the user equipment from the first base station to the second base station, and calculating a maximum allowed transmit power for the user equipment to be used following the handover based on the determined maximum degree of interferences.

18 Claims, 1 Drawing Sheet

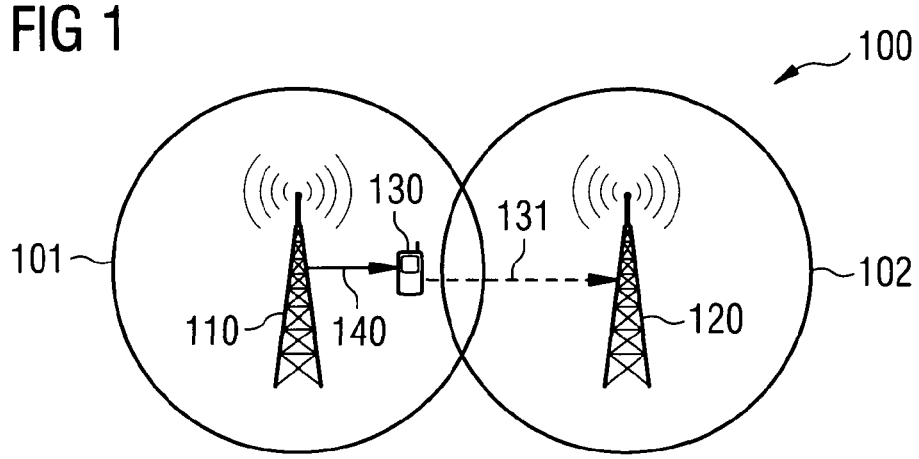
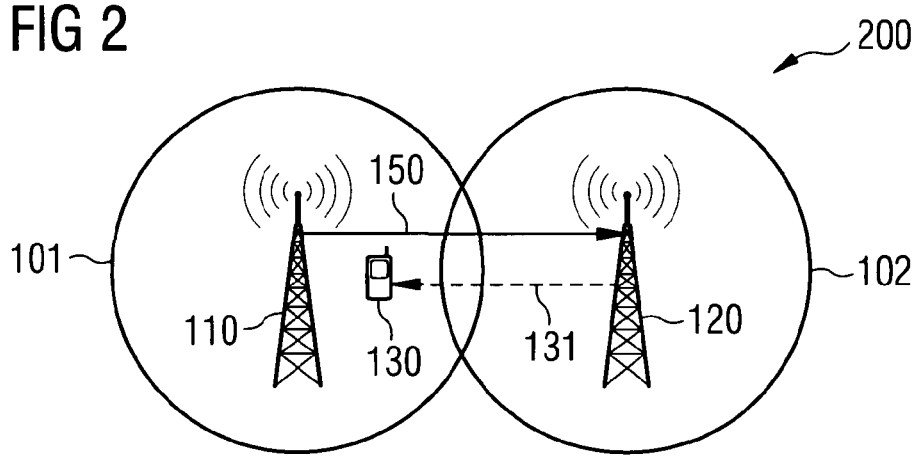
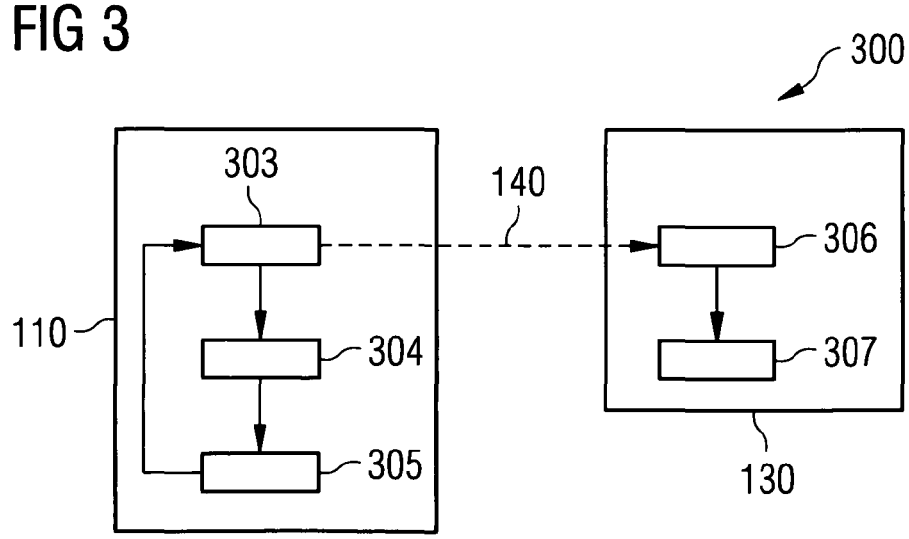

METHOD FOR CALCULATING A TRANSMIT POWER FOR A USER EQUIPMENT

FIELD OF INVENTION

The present invention relates to the field of cellular networks and in particular to cellular heterogeneous networks with different cell types.

ART BACKGROUND

Modern wireless communication networks often are organized in a cell structure. Between neighbouring cells, interferences may occur, especially when a user equipment is handed over from his source cell to a target or neighbouring cell. In such a case, the user may suddenly appear as an interferer to the source cell after the handover to the target cell.

For example in the case, when a user equipment (UE) is about to make an intra-frequency handover from the source cell to the target cell, after completion of the handover to the source cell, the signal from the UE may appear as interference in the source cell contributing to noise rise. In particular in heterogeneous networks with different cell types, the interferences may be noticeable. Therefore, there may be a need for an improved system and method, wherein such interferences may be reduced.

SUMMARY OF THE INVENTION

This need may be met by the subject matter according to the independent claims. Advantageous embodiments of the present invention are described by the dependent claims.

According to a first aspect of the invention there is provided a method of calculating a maximum allowed transmit power for a user equipment within a cellular network system, wherein the cellular network system comprises a first cell having a first base station and a second cell having a second base station, and the user equipment is served by the first base station, the method comprising determining, by the first base station, a maximum degree of interferences being tolerable by the first base station, wherein the interferences are caused by the user equipment following a handover of the user equipment from the first base station to the second base station, and calculating a maximum allowed transmit power for the user equipment to be used following the handover based on the determined maximum degree of interferences.

This aspect of the invention is based on the idea to control the uplink power of user equipments, in particular for cellular heterogeneous networks, by the base station of a source cell. When a user equipment is handed over from its current source cell to another target cell, the user will suddenly appear as an interferer to the source cell after the handover to the target cell. According to this aspect of the invention, controlling of such interference problems via smart configuration of terminal uplink power control may be performed. The method of calculating a maximum transmit power for a user equipment according to this aspect may be applicable to 3GPP cellular standards such as WCDMA, HSPA, and LTE, but is not limited to those systems.

In the following, an exemplary scenario will be described, where a user equipment (UE) is about to make an intra-frequency handover from a source cell to a target cell. After completion of the handover to the source cell, the signal from the UE will appear as interference in the source cell contributing to noise rise. For standard cellular systems, where all cells are macro-cells, this problem may be of less significance, since the UE just continues to work under same uplink (UL) power control rules when moving from the source cell to the target cell. However, for heterogeneous networks with different cell types, the situation may be significantly different. Several cases with different cell types may be considered such as:

Outdoor macro cells with relative high transmit powers
Outdoor micro cells with medium level transmit powers
Indoor or outdoor pico cells with low transmit powers
Indoor or outdoor femto cells with transmit powers lower than UEs, and potentially having restricted access modes.

Given these different cell-types, several example cases may be considered:

It is known from multiple studies that the UL transmission power of UEs served in femtocells need to be limited to avoid creating too much UL interference for co-channel deployed macro-cells. If femtocell-UEs transmit with too high UL power, then it could in worst-case cause significant UL macrocell problems, resulting in macrocell UL performance and coverage problems.

For cases with co-channel deployment of macro and micro/pico, several LTE performance studies have shown that it may be important to use different UE UL power control parameterizations depending on whether the UE is served on macro, micro, or pico. Among others, the latter may be needed to account for the differences in downlink (DL) transmit powers from the different cell types, as handover decisions are typically based on DL UE measurements. Secondly, the maximum UE transmit power may need to be controlled to different levels depending on its serving cell type to control the interference between co-channel deployed base station layers (i.e. between macro, micro, pico, etc.).

These problems may be considered for example for the case with co-channel deployment of macro and femtocells. Common solutions considered for such cases can be summarized as follows:

The maximum transmit power of femtocell-UEs may be limited to a value below their maximum transmit power capability. The latter is also known as the power capping value for the femtocell-UE.

The configured maximum power capping value for each femtocell-UE may be either statically configured to a fixed value for all femtocell-UEs, or set individual for each femtocell-UE depending on e.g. femtocell NLM (Network Listen Mode) measurements towards macrocells, or based on individual femtocell-UE measurements.

The above mentioned examples refer to the Femtocell area. Until now, no specific solution exists for WCDMA/HSPA and LTE, where multi-cell UE knowledge in the network during handovers could be exploited.

According to the first aspect of the invention, a method is provided which could be used for different cellular networks, for example for co-channel deployed networks having different cell types, but also for cellular networks having the same cell types.

For a UE being in the connected mode a handover (HO) may be carried out from the first base station of the first or source cell to the second base station of the second or target cell. Upon HO from source cell to target cell, the source cell, in particular the base station of the source cell, may be able to estimate how much interference, i.e. which maximum degree of interferences, it can maximum tolerate from the UE after the UE has been handed over to the target cell.

Based on this information, the base station of the source cell is able to calculate the maximum transmit power from the UE, which the source cell can tolerate after the UE has been handed over to the target cell. The higher the transmit power of the UE, the higher will be the caused interferences and therefore the degree of interferences being present in the source or first cell. Only a specific degree of interferences may be tolerable by the first base station of the first cell, so that the first base station may ensure a sufficient signal quality for other UEs being associated to the first base station.

It should be noted that according to this aspect of the invention, the base station of the source cell is responsible for calculating the maximum allowed transmit power for the UE to be used after the HO to the target cell. In common systems, the base station of the target cell would responsible to calculate and determine the transmit power settings.

According to a further embodiment of the invention, the method further comprises configuring the user equipment to maximally transmit with the maximum allowed transmit power following the handover.

Configuring the user equipment may be carried out by sending a configuration signal to the user equipment comprising information of the maximum allowed transmit power.

According to a further embodiment of the invention, configuring the user equipment comprises sending a signal from the first base station to the user equipment before the handover, the signal comprising information about the maximum allowed transmit power following the handover.

The first base station may use higher layer signalling to inform the UE which maximum transmit power it is allowed to use after the serving cell change. For example a Radio Resource Control (RRC) message, also called RRC signalling, may comprise the information about the maximum allowed transmit power for the UE.

According to a further embodiment of the invention, the method further comprises sending a signal from the user equipment to the second base station following the handover, the signal comprising the information about the maximum allowed transmit power following the handover.

Once the UE has experienced HO to the target cell, i.e. the second base station of the second cell, it may inform the setting, i.e. the maximum allowed transmit power, to the base station of its new serving cell also via higher layer signalling.

According to a further embodiment of the invention, configuring the user equipment comprises sending a signal from the first base station to the second base station before the handover, the signal comprising information about the maximum allowed transmit power for the user equipment following the handover.

The first base station may signal the UE specific maximum power directly to the second base station. This may be used for example, if there exists a direct communication link between macro and femtocells.

According to a further embodiment of the invention, configuring the user equipment further comprises sending a signal from the second base station to the user equipment before the handover, the signal comprising the information about the maximum allowed transmit power following the handover.

Once the HO from first base station to second base station is executed, the new serving cell may configure the UE with the corresponding maximum allowed transmit power setting via higher layer signalling in coherence with the received information from the former source cell. For example for cases with X2 between macro and femtocells, X2 messages might provide the possibility to signal UE specific maximum power transmit settings. A further alternative would be to rely on proprietary vendor specific inter-node signalling.

According to a further embodiment of the invention, configuring the user equipment further comprises setting a time period in which the user equipment is allowed to maximally transmit with the maximum allowed transmit power following the handover.

The UE may respect this maximum transmit power setting at least for a specific time period after it has experienced the serving cell change. The time period may be signaled to the UE together with the maximum allowed transmit power.

According to a further embodiment of the invention, the method further comprises sending a signal from the second base station to the user equipment following the handover in response to a trigger event, the signal comprising information for configuring the user equipment to transmit with a new maximum allowed transmit power.

According to this embodiment, the UE may respect this maximum transmit power setting until it receives a new maximum power setting from the new serving cell. For example, the new serving cell may after some time configure the UE with a new maximum transmit power setting.

According to a further embodiment of the invention, the trigger event is one of the group comprising an expired time period, a spatial position of the user equipment, and an ending of the active session of the user equipment.

A time period may be determined and upon expiring of this time period, the second base station may signal a new maximum transmit power to the UE. The time period may start, when the UE is handed over to the second base station. A further trigger event may be, if the UE has moved further away from its old serving cell. This results in that the path loss to the first base station has further increased. A further trigger event may be the ending of the active session of the UE. An ending of the active session results in that no further interferences are caused by the UE. Also several other mechanisms or trigger events could be possible.

According to a further embodiment of the invention, determining a maximum degree of interferences is based on at least one of the group comprising uplink noise currently received by the first base station, current interference power in the first cell, and current load in the first cell.

The first base station may determine a maximum tolerable degree of interferences based on local knowledge, for example of currently received uplink noise and interference power, current load in the source cell, etc. Further, from the UE HO measurements, for example received signal code power (RSCP) for WCDMA/HSPA or reference signal received power (RSRP) for LTE, the first base station may know the integral path loss from the first base station to the UE. The first base station may furthermore assume that this path loss value measured shortly before the HO is the point at which the maximum received power will be received from UE. Based on this information, the first base station may be able to calculate the maximum transmit power from the UE, which the first base station in the first cell or source cell may be able to tolerate after the UE has been handed over to the second base station.

According to a second aspect of the invention, there is provided a first base station for calculating a maximum allowed transmit power for a user equipment within a cellular network system, wherein the cellular network system comprises a first cell having the first base station and a second cell having a second base station, and wherein the first base station is configured for serving the user equipment, the first base station comprising a determination unit for determining a maximum degree of interferences being tolerable by the first base station, wherein the interferences are caused by the user equipment following a handover of the user equipment from the first base station to the second base station, and a calculation unit for calculating a maximum allowed transmit power for the user equipment to be used following the handover based on the determined maximum degree of interferences.

The base station may be any type of access point or point of attachment, which is capable of providing a wireless access to a cellular network system. Thereby, the wireless access may be provided for a user equipment or for any other network element, which is capable of communicating in a wireless manner. The base station may be an eNodeB, eNB, home NodeB or HNB, or any other kind of access point.

The base station may comprise a receiving unit, for example a receiver as known by a skilled person. The base station may also comprise a transmitter. The receiver and the transmitter may be implemented as one single unit, for example as a transceiver. The transceiver or the receiving unit and the transmitter may be adapted to communicate with a second base station or the user equipment via an antenna.

The determination unit and the calculation unit may be implemented as single units or may be implemented for example as parts of a control unit, like a CPU or a microcontroller. The base station may further comprise a unit being adapted to provide the user equipment with a signal for configuring the user equipment to transmit with a predetermined transmit power, for example the maximum allowed transmit power.

According to a third aspect of the invention, there is provided a user equipment for a cellular network system, wherein the cellular network system comprises a first cell having a first base station as described above and a second cell having a second base station, wherein the user equipment is servable by the first base station, the user equipment comprising a configuration unit being adapted to configure the user equipment to maximally transmit with a maximum allowed transmit power following the handover.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiver which is adapted for receiving signals from the first base station and the second base station. The configuration unit of the user equipment may be implemented for example as part of a control unit, like a CPU or a microcontroller. Based on signals received by the receiver, the configuration unit may configure the user equipment to maximally transmit with a maximum allowed transmit power. The configuration unit and the receiver may be coupled or may be implemented as one single unit.

The user equipment may comprise a transmitting unit for transmitting signal with the maximum allowed transmit power. The transmitting unit may be a transmitter as known by a skilled person. The receiver and the transmitting unit may be implemented as one single unit, for example as a transceiver. The transceiver or the receiver and the transmitting unit may be adapted to communicate with the first base station and the second base station via an antenna.

According to a fourth aspect of the invention, there is provided a cellular network system, the cellular network system comprising a first base station as described above, and a user equipment as described above.

Generally herein, the method and embodiments of the method according to the first aspect may include performing one or more functions described with regard to the second, third or fourth aspect or an embodiment thereof. Vice versa, the base station, user equipment or cellular network system and embodiments thereof according to the second, third and fourth aspect may include units or devices for performing one or more functions described with regard to the first aspect or an embodiment thereof.

According to a fifth aspect of the herein disclosed subject-matter, a computer program for calculating a maximum allowed transmit power, is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station, a user equipment and a method of calculating a maximum allowed transmit power. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless other notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

BRIEF DESCRIPTION OF THE DRAWING

FIG. 1 shows a cellular network system according to an exemplary embodiment of the present invention.

FIG. 2 shows a cellular network system according to a further exemplary embodiment of the invention.

FIG. 3 shows a base station and a user equipment within a cellular network system according to an exemplary embodiment of the invention.

DETAILED DESCRIPTION

The illustration in the drawing is schematically. It is noted that in different figures, similar or identical elements are provided with the same reference signs or with reference signs, which are different from the corresponding reference signs only within the first digit.

In the following, embodiments of the herein disclosed subject matter are illustrated with reference to the drawings and reference to aspects of current standards, such as LTE. However, such reference to current standards is only exemplary and should not be considered as limiting the scope of the claims.

FIG. 1 shows a cellular network system 100. The cellular network system comprises a first cell 101 having a first base station 110 and a second cell 102 having a second base station 120. A user equipment 130 is served by the first base station 110. Before handing over the user equipment 130 to the second base station 120, a calculation of a maximum allowed transmit power for the user equipment may be carried out by the first base station. The first base station may start to calculate the maximum allowed transmit power, when an active mode UE starts to experience handover.

Before calculating the maximum allowed transmit power for the user equipment (UE), the first base station determines a maximum degree of interferences being tolerable by the first base station. The interferences may be caused by the user equipment following a handover of the user equipment from the first base station to the second base station. The first base station is able, upon HO of the UE from the first or source cell to the second or target cell, to estimate how much interference it can maximum tolerate from the UE after it has been handed over to the target cell. The source cell can basically estimate this based on local knowledge of currently received uplink noise and interference power, current load in the source cell, etc. Further, from the UE HO measurements, the source cell knows the integral path loss from source cell to UE. The source cell can furthermore assume that this path loss value measured shortly before the HO is the point at which the maximum received power will be received from UE. Based on this information, the first base station 110 of the source cell 101 is able to calculate the maximum transmit power for the UE 130, which the source cell can tolerate after the UE has been handed over to the target cell 102. The calculation is based on the determined maximum degree of interferences.

It should be noted that the source cell 101 is responsible for calculating the maximum allowed transmit power for the UE to be used after the HO to the target cell. In common systems, the target cell would be responsible for calculating the transmit power for the UE.

As shown in FIG. 1, the first base station 110 informs the UE 130 which maximum transmit power it is allowed to use after the serving cell change. This is indicated by arrow 140. Once the UE 130 has experienced HO to the second base station 120 of the target cell 102, it can signal the setting, i.e. the maximum allowed transmit power, to its new serving cell via higher layer signalling. This is indicated by the dashed arrow 131. This signalling will be carried out after the HO. For this signalling, RRC messages may be used for WCDMA/HSPA and/or LTE systems, which may include maximum UE transmit power configurations. Such a network system may be used for macro, pico and femto cells.

The UE may respect and maintain this maximum transmit power setting for a predetermined time period after it has experienced the serving cell change, or until it receives a new maximum power setting from the new serving cell. As an example of the latter, the new serving cell may configure the UE after some time with a new maximum transmit power setting if the UE e.g. has moved further away from its old serving cell, i.e. the path loss to old serving cell has further increased. The new power configuration may also be triggered by some defined events, for example that the active session stops or other mechanisms.

FIG. 2 shows a further exemplary embodiment of the invention, wherein, in contrast to FIG. 1, the first base station 110 sends a signal comprising the transmit power settings for the UE 130 to the second base station 120.

If there is a direct communication link, for example between macro and femtocells, between the cells, the first base station 110 may signal the UE specific maximum power directly to the second base station 120 of the target cell 102. This is indicated by arrow 150. Once the HO from source cell 101 to target cell 102 is executed, the new serving cell would then configure the UE with the corresponding maximum allowed transmit power setting via higher layer signalling in coherence with the received information from the former source cell. This is indicated by dashed arrow 131.

This direct communication between the first and the second base station may use for example X2 messages between macro and femtocells which have the possibility to signal UE specific maximum power transmit settings. A network system as shown in FIG. 2 may be applicable for scenario with macro, micro, and pico cells. It may also be applicable for LTE by using X2 messages between macro, micro, and pico cells being able to signal maximum UE transmit power settings between cells.

Similarly, for WCDMA/HSPA, the signalling of maximum UE transmit power settings between macro, micro, and pico cells could happen via Iub (if cells are under same RNC), or via a combination of Iub and Iur if cells are under different RNCs.

FIG. 3 shows a cellular network system 300 according to an exemplary embodiment of the invention. The cellular network system comprises a first base station 110 and a user equipment 130.

The base station 110 may be any type of access point or point of attachment, which is capable of providing a wireless access to a telecommunication network. Thereby, the wireless access may be provided for a user equipment 130 or for any other network element, which is capable of communicating in a wireless manner.

The base station comprises a receiver as known by a skilled person. The base station may also comprise a transmitter. The receiver and the transmitter may be implemented as one single unit, for example as a transceiver 303 as shown in FIG. 3. The transceiver or the receiving unit and the transmitter may be adapted to communicate with a second base station (not shown) or the user equipment 130 via an antenna.

The base station 110 comprises further a determination unit 304. The determination unit may be implemented for example as part of a control unit, like a CPU or a microcontroller, or may be implemented as a single unit. The determination unit is adapted to receive information signals for example from the transceiver, comprising for example information about uplink noise currently received by the first base station via the transceiver, current interference power or current load in the first cell. Based on this local knowledge, the determination unit is adapted for determining a maximum degree of interferences being tolerable by the first base station 110. The interferences are caused by the user equipment 130 following a handover of the user equipment from the first base station to the second base station (not shown).

The base station comprises further a calculation unit 305. The calculation unit, which may also be implemented for example as part of a control unit, like a CPU or a microcontroller and/or which may be implemented as a single unit together with the determination unit, may be adapted to calculate a maximum allowed transmit power for the user equipment to be used following the handover based on the determined maximum degree of interferences. The calculation unit may be coupled with the determination unit and may be adapted to receive an information signal from the determination unit comprising the determined maximum degree of interferences. The calculation unit may be further adapted to transmit a signal via the transceiver or a transmitter of the base station directly to the user equipment or to the second base station, wherein the signal comprises information about the maximum allowed transmit power for the user equipment to be used following the handover.

The user equipment (UE) 130 may be any type of communication end device, which is capable of connecting with the described base station. The UE may be in particular a cellular mobile phone, a Personal Digital Assistant (PDA), a notebook computer, a printer and/or any other movable communication device.

The user equipment may 130 comprise a transceiver which is adapted for receiving signals from the first base station 110 and the second base station (not shown). The transceiver is further adapted to transmit signals to the first base station and to the second base station. The transceiver may also be implemented as two separate units, i.e. a transmitting unit, for example a transmitter as known by a skilled person, and a receiving unit, for example a common known receiver. The transceiver or the receiving and the transmitting unit may be adapted to communicate with the first base station and the second base station via an antenna.

Prior to the handover, the user equipment 130 is served by the first base station. The user equipment is adapted to receive via the transceiver 306 as shown in FIG. 3, or via a separate receiving unit, a signal, either from the first base station 110 as shown in FIG. 3 or from the second base station as described in the context of FIG. 2, comprising information about the maximum allowed transmit power following the handover from the first base station 110 to the second base station.

The transceiver 306 may be coupled to a configuration unit 307. The configuration unit 307 of the user equipment may be implemented for example as part of a control unit, like a CPU or a microcontroller, or may be implemented as a single unit providing the described functionality. The configuration unit is adapted to configure the user equipment 130, based on the information received by the transceiver and provided to the configuration unit, to maximally transmit with a maximum allowed transmit power following the handover.

Afterwards, following the handover, the transceiver 306 of the UE 130 may receive a further signal from the second base station comprising information about a new maximum allowed transmit power. Based on this signal, which may be provided from the transceiver to the configuration unit, the configuration unit 307 of the UE 130 may then configure the UE 130 in a way to transmit with the new maximum allowed transmit power.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the calculation unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularity on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps and the "a" or "an" does not exclude a plurality. It may also be possible in further refinements of the invention to combine features from different embodiments described herein above. It should also be noted that reference signs in the claims should not be construed as limiting the scope of the claims.

In order to recapitulate the above described embodiments of the present invention one can state:

By exploiting the multi-cell knowledge from source and target cell during handover, it may be possible to more accurately control uplink performance and avoid interference problems by letting the source cell determine the maximum allowed UL transmit power for the user equipment in its new cell.

The proposed method, base station, user equipment and network system may result in better system performance, with much lower of risk of experiencing UL interference problems.

The proposed method, base station, user equipment and network system may be used for handover between different cell-types, but also if all cells are for example common macro cells.

LIST OF REFERENCE SIGNS

100 Cellular network system
101 First cell
102 Second cell
110 First base station
120 Second base station
130 User equipment 131 Signal between user equipment and second base station
140 Signal between first base station and user equipment
150 Signal between first base station and second base station
200 Cellular network system
300 Cellular network system
303 Transceiver of base station
304 Determination unit of base station
305 Calculation unit of base station
306 Transceiver of user equipment
307 Configuration unit of user equipment

The invention claimed is:

1. A method comprising:
calculating a maximum allowed transmit power for a user equipment within a cellular network system, wherein the cellular network system comprises a first cell having a first base station and a second cell having a second base station, and the user equipment is served by the first base station,
comprising
determining, by the first base station, a maximum degree of interferences being tolerable by the first base station, wherein the interferences are caused by the user equipment following a handover of the user equipment from the first base station to the second base station,
calculating a maximum allowed transmit power for the user equipment to be used following the handover based on the determined maximum degree of interferences, and
configuring the user equipment to maximally transmit with the maximum allowed transmit power following the handover, wherein configuring the user equipment further comprises
setting a time period in which the user equipment is allowed to maximally transmit with the maximum allowed transmit power following the handover.

2. The method as set forth in claim 1,
wherein configuring the user equipment comprises
sending a signal from the first base station to the user equipment before the handover, the signal comprising information about the maximum allowed transmit power following the handover.

3. The method as set forth in claim 2,
further comprising sending a signal from the user equipment to the second base station following the handover, the signal comprising the information about the maximum allowed transmit power following the handover.

4. The method as set forth in claim 1,
wherein configuring the user equipment comprises sending a signal from the first base station to the second base station before the handover, the signal comprising information about the maximum allowed transmit power for the user equipment following the handover.

5. The method as set forth in claim 4,
wherein configuring the user equipment further comprises
sending a signal from the second base station to the user equipment before the handover, the signal comprising the information about the maximum allowed transmit power following the handover.

6. The method as set forth in claim 1, further comprising
sending a signal from the second base station to the user equipment following the handover in response to a trigger event, the signal comprising information for configuring the user equipment to transmit with a new maximum allowed transmit power.

7. The method as set forth in claim 6, wherein
the trigger event is one of the group comprising an expired time period, a spatial position of the user equipment, and an ending of the active session of the user equipment.

8. The method as set forth in claim 1,
wherein determining a maximum degree of interferences is based on at least one of the group comprising uplink noise currently received by the first base station, current interference power in the first cell, and current load in the first cell.

9. A first base station for calculating a maximum allowed transmit power for a user equipment within a cellular network system, wherein the cellular network system comprises a first cell having the first base station and a second cell having a second base station, and wherein the first base station is configured for serving the user equipment,
the first base station comprising
a determination unit for determining a maximum degree of interferences being tolerable by the first base station, wherein the interferences are caused by the user equipment following a handover of the user equipment from the first base station to the second base station, and
a calculation unit for calculating a maximum allowed transmit power for the user equipment to be used following the handover based on the determined maximum degree of interferences, and
a configuration unit for configuring the user equipment to maximally transmit with the maximum allowed transmit power following the handover, wherein configuring the user equipment further comprises
setting a time period in which the user equipment is allowed to maximally transmit with the maximum allowed transmit power following the handover.

10. A user equipment for a cellular network system, wherein the cellular network system comprises a first cell having a first base station according to claim 9 and a second cell having a second base station,
wherein the user equipment is servable by the first base station.

11. An apparatus comprising:
at least one processor; and
at least one memory including computer program code, where the at least one memory and the computer program code are configured, with the at least one processor, to cause the apparatus to at least:
calculate a maximum allowed transmit power for a user equipment within a cellular network system, wherein the cellular network system comprises a first cell having a first base station and a second cell having a second base station, and the user equipment is served by the first base station,
comprising
determining, a maximum degree of interferences being tolerable by the first base station, wherein the interferences are caused by the user equipment following a handover of the user equipment from the first base station to the second base station,
calculating a maximum allowed transmit power for the user equipment to be used following the handover based on the determined maximum degree of interferences, and configuring the user equipment to maximally transmit with the maximum allowed transmit power following the handover, wherein configuring the user equipment further comprises setting a time period in which the user equipment is allowed to maximally transmit with the maximum allowed transmit power following the handover.

12. The apparatus as set forth in claim 11, wherein configuring the user equipment comprises sending a signal from the first base station to the user equipment before the handover, the signal comprising information about the maximum allowed transmit power following the handover.

13. The apparatus as set forth in claim 12, wherein the at least one memory including the computer program code is configured with the at least one processor to cause the apparatus to:

send a signal from the user equipment to the second base station following the handover, the signal comprising the information about the maximum allowed transmit power following the handover.

14. The apparatus as set forth in claim 11, wherein configuring the user equipment comprises sending a signal from the first base station to the second base station before the handover, the signal comprising information about the maximum allowed transmit power for the user equipment following the handover.

15. The apparatus as set forth in claim 14, wherein configuring the user equipment further comprises sending a signal from the second base station to the user equipment before the handover, the signal comprising the information about the maximum allowed transmit power following the handover.

16. The apparatus as set forth in claim 11, wherein the at least one memory including the computer program code is configured with the at least one processor to cause the apparatus to:

send a signal from the second base station to the user equipment following the handover in response to a trigger event, the signal comprising information for configuring the user equipment to transmit with a new maximum allowed transmit power.

17. The apparatus as set forth in claim 16, wherein the trigger event is one of the group comprising an expired time period, a spatial position of the user equipment, and an ending of the active session of the user equipment.

18. The apparatus as set forth in claim 11, wherein determining a maximum degree of interferences is based on at least one of the group comprising uplink noise currently received by the first base station, current interference power in the first cell, and current load in the first cell.

* * * * *